(12) United States Patent
Westhäuser et al.

(10) Patent No.: US 11,772,458 B2
(45) Date of Patent: Oct. 3, 2023

(54) METHOD OF DE-ICING A HEAT EXCHANGER OF A MOTOR VEHICLE AND MOTOR VEHICLE WITH A HEAT EXCHANGER

(71) Applicant: VOLKSWAGEN AKTIENGESELLSCHAFT, Wolfsburg (DE)

(72) Inventors: Jochen Westhäuser, Braunschweig (DE); Jan-Christoph Albrecht, Wolfsburg (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 0 days.

(21) Appl. No.: 17/342,312

(22) Filed: Jun. 8, 2021

(65) Prior Publication Data
US 2021/0379966 A1 Dec. 9, 2021

(30) Foreign Application Priority Data
Jun. 9, 2020 (DE) .................... 10 2020 207 170.5

(51) Int. Cl.
*B60H 1/32* (2006.01)
(52) U.S. Cl.
CPC .................. *B60H 1/321* (2013.01)
(58) Field of Classification Search
CPC ............... B60H 1/321; B60H 1/00899; B60H 2001/00961; B60H 1/00321;
(Continued)

(56) References Cited

U.S. PATENT DOCUMENTS

2012/0262881 A1\* 10/2012 Onimaru ................. B60L 3/003
361/701
2013/0081419 A1 4/2013 Hatoh et al.
(Continued)

FOREIGN PATENT DOCUMENTS

DE 10 2007 062 512 A1 6/2009
DE 10 2011 051 285 A1 12/2012
(Continued)

OTHER PUBLICATIONS

Search report for German Patent Application No. 10 2020 207 170.5, dated Jan. 22, 2021.

*Primary Examiner* — Nelson J Nieves
*Assistant Examiner* — Matthew John Moscola
(74) *Attorney, Agent, or Firm* — PEARL COHEN ZEDEK LATZER BARATZ LLP

(57) ABSTRACT

In order to provide a method for de-icing a heat exchanger of a motor vehicle, which prevents large amounts of melt water from a defrosting process running onto the floor or the road beneath the motor vehicle, freeze again and pose a risk of injury to pedestrians, in a method for defrosting a heat exchanger of a motor vehicle, in which, for a heat exchanger arranged in a motor vehicle, a defrosting process for removing a layer of frozen water or frost formed on a surface of the heat exchanger is carried out, the defrosting process comprising heating the surface, and melt water being produced, it is proposed that the amount of melt water discharged onto a local region of a floor beneath the motor vehicle is limited to a maximum value.

15 Claims, 1 Drawing Sheet

(58) Field of Classification Search
CPC ..... B60H 1/00878; B60K 11/085; F25B 1/00; Y02T 10/88; F28F 17/00
See application file for complete search history.

(56) References Cited

U.S. PATENT DOCUMENTS

| | | | |
|---|---|---|---|
| 2013/0118195 A1* | 5/2013 | Ikemiya | F25B 49/005 |
| | | | 62/126 |
| 2014/0075966 A1 | 3/2014 | Schmitz et al. | |
| 2016/0076826 A1 | 3/2016 | Augenstein et al. | |
| 2018/0347890 A1 | 12/2018 | Jahn et al. | |
| 2019/0009647 A1 | 1/2019 | Huenemoerder | |
| 2019/0217975 A1* | 7/2019 | Casci | B60H 1/32331 |
| 2020/0055370 A1* | 2/2020 | Katayama | F25B 47/02 |
| 2020/0207182 A1* | 7/2020 | Ishizeki | B60H 1/143 |

FOREIGN PATENT DOCUMENTS

| | | |
|---|---|---|
| DE | 11 2011 101 957 T5 | 3/2013 |
| DE | 10 2013 110 224 A1 | 3/2014 |
| DE | 10 2014 218 378 A1 | 3/2016 |
| DE | 10 2015 215 955 A1 | 3/2017 |
| DE | 10 2017 003 524 A1 | 7/2018 |
| DE | 10 2017 005 298 A1 | 12/2018 |
| DE | 10 2017 115 190 A1 | 1/2019 |
| DE | 10 2018 116 181 A1 | 1/2020 |

* cited by examiner

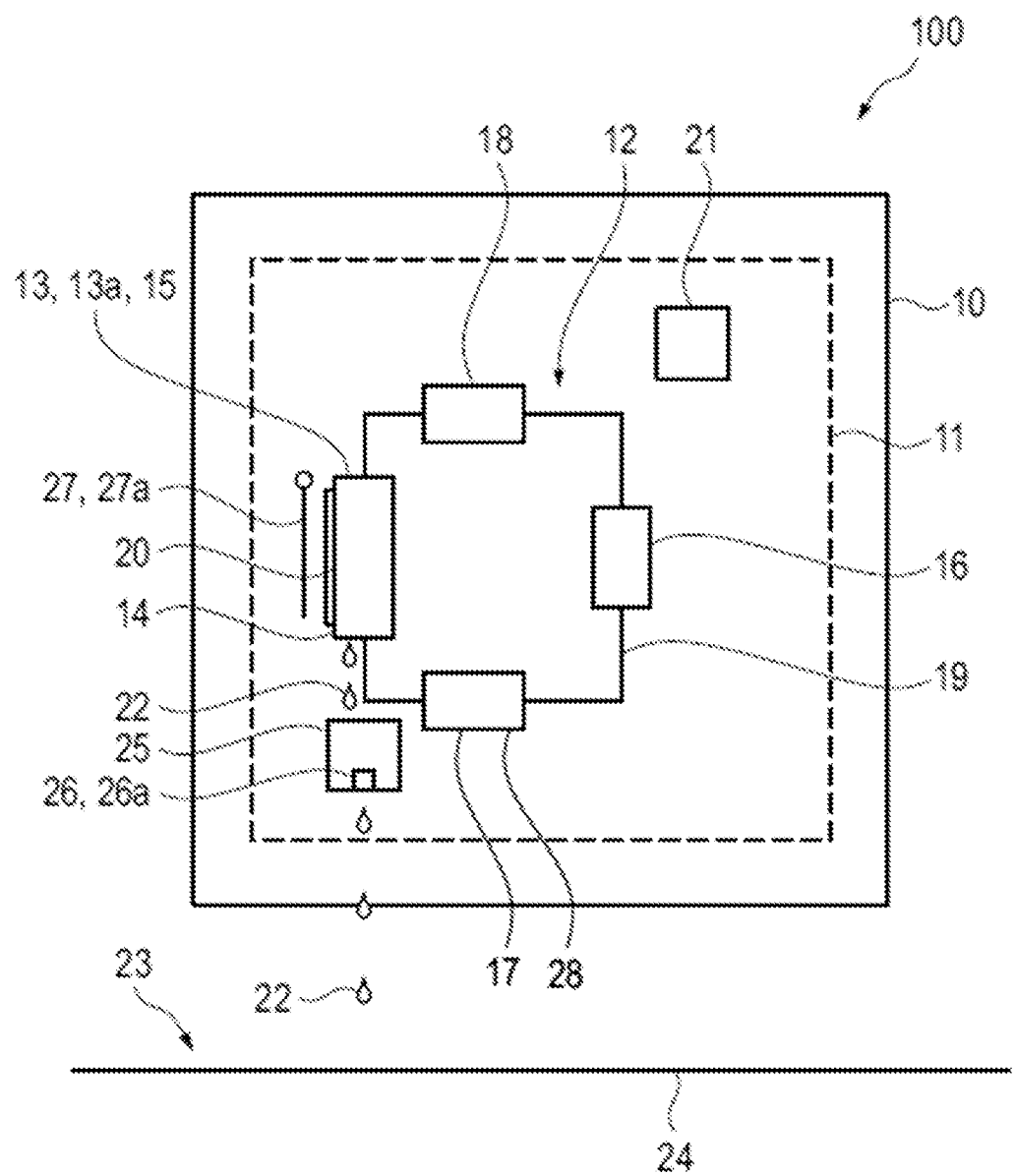

1

METHOD OF DE-ICING A HEAT EXCHANGER OF A MOTOR VEHICLE AND MOTOR VEHICLE WITH A HEAT EXCHANGER

CROSS REFERENCE TO RELATED APPLICATIONS

This application claims priority from German Patent Application No. 10 2020 207 170.5, filed Jun. 9, 2020, which is hereby incorporated by reference in its entirety.

FIELD OF THE INVENTION

The present invention relates to a method for de-icing a heat exchanger of a motor vehicle, in which, for a heat exchanger arranged in a motor vehicle, a defrosting process for removing a layer of frozen water or frost formed on a surface of the heat exchanger is carried out, the defrosting process comprising heating the surface, melt water being produced. The present invention also relates to a motor vehicle comprising a heat exchanger and a control unit for carrying out a method for de-icing the heat exchanger.

BACKGROUND OF THE INVENTION

Air conditioning devices or air conditioning systems are used in various areas of technology. Air conditioning devices or air conditioning systems having heat pumps are used in particular in electromobility. The use of air conditioning devices having heat pumps in electric vehicles is advantageous, since in electric vehicles no waste heat from an internal combustion engine is available for heating a passenger compartment. Instead, the heat required for heating is taken from the outside air by means of the heat pump and fed into the passenger compartment. For this purpose, the heat exchanger of the heat pump that is in contact with the outside air must be cooled below the ambient temperature of the outside air.

If the outside air falls below its dew point when the heat exchanger cools, a layer of frozen water, in particular frost or ice, forms on the surface of the heat exchanger. The layer of frozen water prevents the outside air from flowing through the heat exchanger, and efficient operation of the heat pump is no longer ensured. In order to allow outside air to flow through the heat exchanger again, defrosting processes are carried out in the prior art in which the heat exchanger is heated. When the heat exchanger is heated, the layer of frozen water melts and outside air can flow through the heat exchanger again.

DE 10 2014 218 378 A1 discloses a gas-cooled heat exchanger for cooling a fluid which can flow through the heat exchanger, comprising a heat transfer block with a plurality of flow channels. The heat exchanger has a first collecting tank and a second collecting tank, the collecting tanks being fluidically connected to one another via the flow channels. A gas can flow through the heat transfer block from the outside. The heat exchanger can thus achieve a heat transfer between the fluid flowing in the flow channels and the gas flowing outside.

An arrangement for de-icing a heat exchanger in a motor vehicle is known from DE 10 2017 115 190 A1. The arrangement generically comprises an air guide housing for the passage of ambient air, having an inlet opening and an outlet opening which are suitable for communicating with the external environment of the motor vehicle. The arrangement also comprises at least one fan and a first heat exchanger which is occasionally to be de-iced, which fan and heat exchanger are arranged between the inlet opening and the outlet opening, the first heat exchanger being operable in an operating mode in which the ambient air that is passed through is cooled. In this case, the inlet opening and the outlet opening are closable and the at least one fan and the first heat exchanger are arranged in the air guide housing in such a way that at least one circulation path can be formed when the inlet opening and the outlet opening are closed.

DE 11 2011 101 957 T5 discloses a heat pump circuit in which refrigerant pipes of an external heat transfer, which serves as an evaporator for evaporating refrigerant, and cooling fluid pipes of a radiator for dissipating heat from a coolant of an electric motor for driving, which serves as an external heat source, are connected to the same external fins. In a defroster operation, which comprises de-icing the heat exchanger by allowing the coolant to flow through the radiator, the loss during the transfer of heat contained in the coolant to the heat exchanger can be prevented and the heat supplied by the electric motor for driving can be used in an effective way for de-icing the external heat exchanger.

DE 10 2015 215 955 A1 discloses an air conditioning device for a motor vehicle and a method for operation thereof. Defrosting processes are mainly initiated when there is only a slight flow of cold outside air through the evaporator, i.e. in particular at low driving speeds, for example below a predetermined limit speed.

DE 10 2007 062 512 A1 discloses a heat exchanger, in particular an evaporator, having at least one collecting tank, a plurality of pipes leading into or out of the collecting tank, and a heat transfer network formed by the pipes in connection with the elements enlarging the heat transfer area, a gap being provided between the elements enlarging the heat transfer area and the collecting tank, and a screen being attached on at least one side of the heat exchanger at the level of the gap formed between the elements enlarging the heat transfer area and the collecting tank.

During the process of defrosting a heat exchanger, considerable amounts of melt water can be produced which can run onto the floor beneath the vehicle, in particular onto the road, and freeze again. The newly formed layer of ice on the floor can, for example, lead to pedestrians slipping and thus injuring themselves.

The problem addressed by the present invention is that of providing a method for de-icing a heat exchanger of a motor vehicle, which prevents large amounts of melt water from a defrosting process running onto the floor or the road beneath the motor vehicle, freeze again and pose a risk of injury to pedestrians.

SUMMARY OF THE INVENTION

In order to solve the problem addressed by the invention, a method for de-icing a heat exchanger of a motor vehicle is proposed, in which, for a heat exchanger arranged in a motor vehicle, a defrosting process for removing a layer of frozen water or frost formed on a surface of the heat exchanger is carried out, the defrosting process comprising heating the surface, melt water being produced; furthermore, the amount of melt water discharged onto a local region of a floor beneath the motor vehicle is limited to a maximum value.

The motor vehicle can be designed as an electric vehicle, a battery electric vehicle or a hybrid electric vehicle.

The heat exchanger of the motor vehicle can be part of a heat pump and/or an air conditioning system or an air conditioning device of the motor vehicle. The heat exchanger is preferably an outside air heat exchanger and is in particular designed to transfer thermal energy from the external environment to a cooling fluid, in particular a coolant or refrigerant. The thermal energy absorbed can be used to heat a passenger compartment of the motor vehicle.

A surface of the heat exchanger is understood to mean in particular a surface of the heat exchanger which is in contact with the external environment, the outside air from which thermal energy is to be extracted preferably flowing over this surface.

The terms "frost," "frost layer," "ice" or "ice layer" or other analogously suitable terms can also be used for the layer of frozen water formed on the surface of the heat exchanger.

Methods for detecting the formation of a layer of frozen water on a surface of a heat exchanger of a motor vehicle are known to a person skilled in the art.

The defrosting process can be a defrosting cycle.

According to the invention, in the method the amount of melt water discharged to a local region of a floor beneath the motor vehicle is limited to a maximum value.

By limiting the amount of melt water discharged to a local region of the floor beneath the motor vehicle to a maximum value, larger local accumulations of melt water on the floor are prevented, so that no larger ice surfaces can form locally on the floor due to re-freezing of the melt water. This reduces the risk of slipping or injury for pedestrians.

The floor is preferably part of a road or a sidewalk.

A "local region" is understood to mean a spatially restricted region of the floor beneath the motor vehicle. The local region can be a limited region at the location of the vehicle in the case of a stationary motor vehicle, for example. The local region can have an area smaller than or equal to $1 \text{ m}^2$, preferably smaller than or equal to $0.5 \text{ m}^2$, particularly preferably smaller than or equal to $0.1 \text{ m}^2$, very particularly preferably smaller than or equal to $0.01 \text{ m}^2$. The local region can also have an area greater than or equal to $0.001 \text{ m}^2$, preferably greater than or equal to $0.005 \text{ m}^2$, particularly preferably greater than or equal to $0.01 \text{ m}^2$. In particular, the local region may have a surface which poses a risk of slipping for pedestrians in the event of icing up.

It can preferably be provided that the method is carried out, in particular exclusively, when the motor vehicle is located in an urban area. Since pedestrians are in particular less likely to be encountered on roads in rural areas or on country roads than in urban areas, freezing melt water is less likely to be a hazard there.

Further advantageously, it can be provided that the maximum value is less than a total amount of melt water produced in the defrosting process, the maximum value being preferably less than 50%, more preferably less than 10%, very particularly preferably less than 5%, of the total amount of melt water produced in the defrosting process.

If, for example, 100 ml of melt water accumulates during a defrosting process, according to the method it can be provided that the amount of melt water discharged to the local region of the floor beneath the motor vehicle is less than 50 ml, more preferably less than 10 ml, particularly preferably less than 5 ml.

It can thus preferably be provided that the maximum value is smaller than 10 cl, preferably smaller than 5 cl, particularly preferably smaller than 1 cl, very particularly preferably smaller than 5 ml.

It can preferably be provided that the amount of melt water discharged per unit area to the local region of the floor beneath the motor vehicle is limited to a maximum value.

In particular, it can be thus provided that the maximum value is smaller than $10 \text{ l/m}^2$, preferably smaller than $5 \text{ l/m}^2$, particularly preferably smaller than $1 \text{ l/m}^2$, very particularly preferably smaller than $0.5 \text{ l/m}^2$, particularly preferably smaller than $0.1 \text{ l/m}^2$.

Further advantageously, it can be provided that the defrosting process is carried out only while the motor vehicle is in motion.

By carrying out the defrosting process exclusively while the motor vehicle is in motion, the melt water is distributed onto the floor over the distance covered during travel. This distribution of the melt water over a large area limits the amount of melt water discharged to a local region of the floor.

It is, therefore, preferably provided that the melt water produced in the defrosting process is distributed, preferably evenly, over a route, in particular on the floor.

Further advantageously, it can be provided that while the defrosting process is being carried out, a screen element, in particular a shutter or a roller blind, is arranged in front of the heat exchanger, so that ambient air is prevented from flowing through the heat exchanger.

By arranging a screen element in front of the heat exchanger, the air flow of the outside or ambient air flowing over the heat exchanger, in particular over the surface, is reduced or stopped, so that efficient defrosting can take place. In particular, the defrosting process can be carried out by arranging a screen element such as a shutter or a roller blind in front of the heat exchanger, even at higher vehicle speeds, so that the melt water resulting during the defrosting process is distributed over a larger region of the floor.

Alternatively or additionally, it can be provided that the defrosting process is carried out only up to a maximum speed of the motor vehicle of 50 km/h, preferably 25 km/h, particularly preferably 15 km/h, very particularly preferably 10 km/h.

By limiting the speed up to which the defrosting process can be carried out, the method can also be carried out without arranging a screen element in front of the heat exchanger. Since the air flow through the heat exchanger is limited or reduced by limiting the speed of the motor vehicle, efficient defrosting can take place.

Furthermore, it can preferably be provided that the melt water is collected in a collecting container.

Collecting the melt water in a collecting container prevents melt water from reaching the floor beneath the vehicle, in particular a local region thereof.

Further advantageously, it can be provided that the collecting container comprises an outlet device, the outlet device preferably limiting the amount of melt water that is discharged to the local region and/or exits from the collecting container per unit area and/or per unit of time, and/or that the outlet device is opened and/or closed for limiting the amount of melt water that is discharged to the local region and/or exits from the collecting container per unit area of the floor and/or per unit of time to the maximum value.

The amount of melt water can be limited, for example, by the outlet device being a hole or an opening with such a small diameter that the melt water can emerge from the collecting container only in droplets.

However, it can also be provided that the outlet device is a valve which can be opened or closed, for example by an electrical control member. In particular, it can be provided that the outlet device is opened only when the motor vehicle is in motion.

Further advantageously, it can be provided that the melt water is evaporated. The melt water can be evaporated, for example, by dripping the melt water onto a compressor housing of a compressor of the heat pump, which heat pump comprises the heat exchanger.

The evaporation of the melt water can effectively reduce or prevent the melt water from dripping onto the floor beneath the motor vehicle, so that in particular the amount of melt water discharged per unit area to the local region of the floor beneath the motor vehicle is limited to a maximum value.

Another solution to the problem addressed by the invention consists in a motor vehicle having a heat exchanger and a control unit, the control unit being designed to carry out a method as described above.

The control unit is designed in particular to determine that the heat transfer has iced up and to initiate a defrosting process. The control unit can also be designed to open or close a valve of a collecting container, for example.

All the features, devices and functions explained for the method described above can also be transferred to the motor vehicle in an analogous manner.

BRIEF DESCRIPTION OF THE DRAWINGS

The method is explained in more detail below with reference to the accompanying drawing.

FIG. 1 is a schematic representation of a motor vehicle with a heat pump comprising a heat exchanger.

DETAILED DESCRIPTION OF THE INVENTION

A method 100 for de-icing a heat exchanger 13 of a motor vehicle 10 is explained with reference to FIG. 1, which is a purely schematic view of a motor vehicle 10 comprising an air conditioning device 11. The air conditioning device 11 comprises a heat pump 12 having a heat exchanger 13. The heat exchanger 13 is an outside air heat exchanger 13a. Outside air or ambient air can flow over a surface 14 of the heat exchanger 13, so that thermal energy can be transferred to a refrigerant flowing through the heat exchanger 13. In the heat pump 12, the heat exchanger 13 functions as an evaporator 15. The heat pump 12 also has a condenser 16 for delivering the thermal energy transported by the refrigerant to a passenger compartment of the motor vehicle 10, a compressor 17 and a throttle 18, and refrigerant lines 19. At low outside temperatures, a layer 20 of frozen water can form on the surface 14 of the heat exchanger 13. If a control unit 21 of the air conditioning device 11 determines that the layer 20 of frozen water is preventing the outside air from flowing through the heat exchanger 13 and that efficient operation of the heat pump 12 is no longer ensured, a defrosting process is initiated.

In this case, the surface 14 is heated, thus producing melt water 22. According to the method, the amount of melt water 22 discharged to a local region 23 of a floor 24 beneath the motor vehicle 10 is then limited to a maximum value.

For example, as shown in FIG. 1, a collecting container 25 can be provided in which the melt water 22 is collected. The collecting container 25 has an outlet device 26 which is designed as a valve 26a. The control unit 21 can be designed to open the valve 26a only when the motor vehicle 10 is in motion, so that the amount of melt water 22 discharged to the local region 23 of a floor 24 beneath the motor vehicle 10 is limited to a maximum value. In order to be able to carry out a defrosting process while the motor vehicle 10 is in motion, a screen element 27 in the form of a roller blind 27a can be provided, which is arranged in front of the heat exchanger 13 in such a way that ambient air is prevented from flowing through the heat exchanger 13.

Alternatively or additionally, it can be provided that at least part of the melt water 22 is dripped onto a compressor housing 28 of the compressor 17 of the heat pump 12, so that the melt water 22 evaporates and does not reach the floor 24 beneath the motor vehicle 10 in liquid form.

LIST OF REFERENCE SIGNS

100 Method
10 Motor vehicle
11 Air conditioning device
12 Heat pump
13 Heat exchanger
13a Outdoor air heat exchanger
14 Surface
15 Evaporator
16 Condenser
17 Compressor
18 Throttle
19 Refrigerant lines
20 Layer of frozen water
21 Control unit
22 Melt water
23 Local region
24 Floor
25 Collecting container
26 Outlet device
26a Valve
27 Screen element
27a Roller blind
28 Compressor housing

The invention claimed is:

1. A method for de-icing a heat exchanger arranged in a motor vehicle, comprising:
carrying out a defrosting process for removing a layer of frozen water or frost formed on a surface of the heat exchanger, wherein the defrosting process comprises heating the surface and producing melt water, and controlling discharge of the melt water to a local region of a floor beneath the motor vehicle, wherein the amount of melt water discharged per unit area to the local region of the floor beneath the motor vehicle is limited to a maximum value, wherein the maximum value is greater than 0 $l/m^2$ and less than 10 $l/m^2$.

2. The method according to claim 1, wherein the maximum value is less than a total amount of melt water produced in the defrosting process.

3. The method according to claim 1, wherein the amount of the meltwater discharged per unit area to the local region of the floor beneath the motor vehicle is limited to a maximum value, the maximum value being less than 5 $l/m^2$.

4. The method according to claim 1, wherein the amount of the melt water discharged per unit area to the local region of the floor beneath the motor vehicle is limited to a maximum value, the maximum value being less than 1 $l/m^2$.

5. The method according to claim 1, wherein the amount of the meltwater discharged per unit area to the local region of the floor beneath the motor vehicle is limited to a maximum value, the maximum value being less than 0.1 $l/m^2$.

6. The method according to claim 1, wherein the defrosting process is carried out only while the motor vehicle is in motion.

7. The method according to claim 6, wherein the melt water produced in the defrosting process is distributed over a route of travel, on the floor.

8. The method according to claim 1, wherein at least one of:
wherein, while the defrosting process is being carried out, a screen element is arranged in front of the heat exchanger, thus preventing the flow of ambient air through the heat exchanger, and
the defrosting process is carried out only up to a maximum speed of the motor vehicle of 50 km/h.

9. The method according to claim 8, wherein the screen element is a shutter or roller blind.

10. The method according to claim 8, wherein the defrosting process is carried out only up to a maximum speed of the motor vehicle of 25 km/h.

11. The method according to claim 8, wherein the defrosting process is carried out only up to a maximum speed of the motor vehicle of 10 km/h.

12. The method according to claim 1, wherein the melt water is collected in a collecting container.

13. The method according to claim 12, wherein at least one of: the collecting container comprises an outlet device that limits the amount of melt water that is discharged to the local region and/or exits from the collecting container per unit a rea of the floor and/or per unit of time, and the outlet device is opened and/or closed for limiting the amount of melt water that is discharged to the local region and/or exits from the collecting container per unit a rea of the floor and/or per unit of time to the maximum value.

14. The method according to claim 12, wherein the melt water collected in the collecting container (22) is allowed to evaporate evaporated.

15. A motor vehicle comprising:
a heat exchanger, and
a control unit, wherein the control unit is designed to carry out a method according to claim 1.

* * * * *